(12) United States Patent
Ngai et al.

(10) Patent No.: US 9,042,241 B2
(45) Date of Patent: May 26, 2015

(54) METHODS AND APPARATUS FOR PROVIDING ROBUST CIRCUIT SWITCH FALL BACK PROCEDURE

(75) Inventors: Francis Ming-Meng Ngai, Louisville, CO (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 12/959,256

(22) Filed: Dec. 2, 2010

(65) Prior Publication Data

US 2012/0140644 A1    Jun. 7, 2012

(51) Int. Cl.
*H04J 1/16* (2006.01)
*H04W 4/00* (2009.01)
*H04W 36/00* (2009.01)
*H04W 74/00* (2009.01)
*H04W 28/18* (2009.01)

(52) U.S. Cl.
CPC .............. *H04W 74/00* (2013.01); *H04W 28/18* (2013.01)

(58) Field of Classification Search
USPC ................. 370/252, 328, 329, 330, 331, 332; 455/436
See application file for complete search history.

(56) References Cited

U.S. PATENT DOCUMENTS

| 6,982,971 | B2* | 1/2006 | Tiedemann et al. | 370/333 |
|---|---|---|---|---|
| 7,974,643 | B2 | 7/2011 | Catovic et al. | |
| 2002/0155858 | A1* | 10/2002 | Blakeney et al. | 455/552 |
| 2006/0276190 | A1* | 12/2006 | Shaheen | 455/436 |
| 2008/0316965 | A1* | 12/2008 | Lotter et al. | 370/329 |
| 2009/0023448 | A1* | 1/2009 | Attar et al. | 455/436 |
| 2010/0195568 | A1 | 8/2010 | Iimori | |
| 2010/0278142 | A1* | 11/2010 | Dwyer et al. | 370/331 |
| 2010/0297979 | A1* | 11/2010 | Watfa et al. | 455/404.1 |
| 2010/0317378 | A1* | 12/2010 | Fang et al. | 455/466 |
| 2011/0064052 | A1* | 3/2011 | Lee | 370/331 |

(Continued)

FOREIGN PATENT DOCUMENTS

JP    2010178209 A    8/2010
JP    2010530700 A    9/2010

(Continued)

OTHER PUBLICATIONS

3rd Generation Partnership Project, Technical Specification Group Radio Access Network, Evolved Universal Terrestrial Radio Access (E-UTRA), Radio Resource Control (RRC), Protocol specification (Release 9), 3GPP Standard, 3GPP TS 36.331, 3RD Generation Partnership Project (3GPP), Mobile Competence Centre, 650, Route Des Lucioles, F-06921 Sophia-Antipolis Cedex, France, No. V9.5.0, Sep. 28, 2010, pp. 1-252, XP050442306, [retrieved on Sep. 28, 2010].

(Continued)

*Primary Examiner* — Yemane Mesfin
*Assistant Examiner* — Peter Chen
(74) *Attorney, Agent, or Firm* — Michael J. DeHaemer, Jr.

(57) ABSTRACT

A method, an apparatus, and a computer program product for wireless communication are provided in which a user equipment (UE) may obtain at least one of a plurality of circuit switched fall back (CSFB) parameters from at least one of an LTE eNodeB or a usable system, wherein the plurality of CSFB parameters comprise a channel list, a system time, and a neighbor list, and may perform one or more system acquisition actions based on the at least one of the plurality of obtained CSFB parameters.

35 Claims, 13 Drawing Sheets

(56) References Cited

U.S. PATENT DOCUMENTS

2011/0149907 A1* 6/2011 Olsson et al. ............... 370/331
2011/0158165 A1* 6/2011 Dwyer et al. ............... 370/328
2011/0188468 A1* 8/2011 Vikberg et al. ............. 370/331

FOREIGN PATENT DOCUMENTS

WO   WO-2008060879 A2   5/2008
WO   WO-2008156266 A1   12/2008

OTHER PUBLICATIONS

3rd Generation Partnership Project, Technical Specification Group Services and System Aspects, Circuit Switched (CS) fallback in Evolved Packet System (EPS), Stage 2 (Release 9). 3GPP Standard, 3GPP TS 23.272, 3RD Generation Partnership Project (3GPP), Mobile Competence Centre, 650, Route Des Lucioles, F-06921 Sophia-Antipolis Cedex, France, No. V9-.5.0, Sep. 29, 2010, pp. 1-72, XP050442327, [retrieved on Sep. 29, 2010].

International Search Report and Written Opinion—PCT/US2011/063146—ISA/EPO—Mar. 7, 2012.

Nortel et al., "1xRTT CS Fallback support", 3GPP Draft, R2-084713—1XRTT CS Fallback Support, 3RD Generation Partnership Project (3GPP), Mobile Competence Centre, 650, Route Des Lucioles, F-06921 Sophia-Antipolis Cedex, France, No. Jeju, 20080819, Aug. 19, 2008, XP050319685, [retrieved Aug. 19, 2008].

Rossetti et al., "Performance Enhancement for CSFB", Alcatel-Lucent, Sep. 15, 2009, XP002667572, Retrieved from the Internet: URL:ftp://ftp.3gpp2.org/TSGC/Working/2009/2009-6_NewportBeach/TSG-C-2009-06-NewportBeach/WG2/C20-20090615-019-ALU_CSFBPerformanceEnhance.pdf.

Taiwan Search Report—TW100144397—TIPO—Nov. 19, 2013.

\* cited by examiner

| LTE provided system time | LTE provided neighbor list | RGS-PS is on chan. list from LTE | System time from RGS-PS still usable | Last active set and neighbor list from RGS-PS still usable | Channel list from ... | System time from ... | Neighbor list from ... | Action |
|---|---|---|---|---|---|---|---|---|
| 0 | 0 | 0 | 0 | 0 | LTE | NA | NA | Full Acq Only |
| 0 | 0 | 0 | 0 | 1 | concat(LTE, RGS-PS) | NA | RGS-PS | Full Acq Only |
| 0 | 0 | 0 | 1 | 0 | concat(LTE, RGS-PS) | RGS-PS | NA | Full Acq Only |
| 0 | 0 | 0 | 1 | 1 | concat(LTE, RGS-PS) | RGS-PS | RGS-PS | Comprehensive |
| 0 | 0 | 1 | 0 | 0 | LTE | NA | NA | Full Acq Only |
| 0 | 0 | 1 | 0 | 1 | LTE | NA | RGS-PS | Full Acq Only |
| 0 | 0 | 1 | 1 | 0 | LTE | RGS-PS | NA | Full Acq Only |
| 0 | 0 | 1 | 1 | 1 | LTE | RGS-PS | RGS-PS | Comprehensive |
| 0 | 1 | 0 | 0 | 0 | LTE | NA | NA | Full Acq Only |
| 0 | 1 | 0 | 0 | 1 | concat(LTE, RGS-PS) | NA | LTE or merged_neigh_list | Full Acq Only |
| 0 | 1 | 0 | 1 | 0 | concat(LTE, RGS-PS) | RGS-PS | LTE | Comprehensive |
| 0 | 1 | 0 | 1 | 1 | concat(LTE, RGS-PS) | RGS-PS | LTE or merged_neigh_list | Comprehensive |
| 0 | 1 | 1 | 0 | 0 | LTE | NA | NA | Full Acq Only |
| 0 | 1 | 1 | 0 | 1 | LTE | NA | LTE or merged_neigh_list | Full Acq Only |
| 0 | 1 | 1 | 1 | 0 | LTE | RGS-PS | LTE | Comprehensive |
| 0 | 1 | 1 | 1 | 1 | LTE | RGS-PS | merged_neigh_list | Comprehensive |
| 1 | 0 | 0 | 0 | 0 | LTE | NA | NA | Full Acq Only |
| 1 | 0 | 0 | 0 | 1 | concat(LTE, RGS-PS) | LTE->RGS-PS | RGS-PS | Comprehensive |
| 1 | 0 | 0 | 1 | 0 | concat(LTE, RGS-PS) | LTE->RGS-PS | NA | Full Acq Only |
| 1 | 0 | 0 | 1 | 1 | concat(LTE, RGS-PS) | LTE->RGS-PS | RGS-PS | Comprehensive |
| 1 | 0 | 1 | 0 | 0 | LTE | NA | NA | Full Acq Only |
| 1 | 0 | 1 | 0 | 1 | LTE | LTE->RGS-PS | RGS-PS | Comprehensive |
| 1 | 0 | 1 | 1 | 0 | LTE | LTE->RGS-PS | NA | Full Acq Only |
| 1 | 0 | 1 | 1 | 1 | LTE | LTE->RGS-PS | RGS-PS | Comprehensive |
| 1 | 1 | 0 | 0 | 0 | LTE | LTE | NA | Comprehensive |
| 1 | 1 | 0 | 0 | 1 | concat(LTE, RGS-PS) | LTE | LTE or merged_neigh_list | Comprehensive |
| 1 | 1 | 0 | 1 | 0 | concat(LTE, RGS-PS) | LTE->RGS-PS | LTE | Comprehensive |
| 1 | 1 | 0 | 1 | 1 | concat(LTE, RGS-PS) | LTE->RGS-PS | LTE or merged_neigh_list | Comprehensive |
| 1 | 1 | 1 | 0 | 0 | LTE | LTE | NA | Comprehensive |
| 1 | 1 | 1 | 0 | 1 | LTE | LTE | LTE or merged_neigh_list | Comprehensive |
| 1 | 1 | 1 | 1 | 0 | LTE | LTE->RGS-PS | LTE | Comprehensive |
| 1 | 1 | 1 | 1 | 1 | LTE | LTE->RGS-PS | LTE or merged_neigh_list | Comprehensive |

FIG. 9

METHODS AND APPARATUS FOR PROVIDING ROBUST CIRCUIT SWITCH FALL BACK PROCEDURE

BACKGROUND

1. Field

The present disclosure relates generally to communication systems, and more particularly, to a system and method for providing a robust redirection/reselection circuit switch fall back (CSFB) procedure in a Long Term Evolution (LTE) environment.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing a robust redirection/reselection CSFB procedure in a LTE environment. The method can comprise obtaining at least one of a plurality of CSFB parameters from at least one of an LTE eNodeB, or a usable system, wherein the plurality of CSFB parameters comprise a channel list, a system time, and a neighbor list, and performing one or more system acquisition actions based on the at least one of the plurality of obtained CSFB parameters.

Yet another aspect relates to an apparatus. The apparatus can include means for obtaining at least one of a plurality of CSFB parameters from at least one of an LTE eNodeB, or a usable system, wherein the plurality of CSFB parameters comprise a channel list, a system time, and a neighbor list, and means for performing one or more system acquisition actions based on the at least one of the plurality of obtained CSFB parameters.

Still another aspect relates to a computer program product comprising a computer-readable medium. The computer-readable medium can include code for obtaining at least one of a plurality of CSFB parameters from at least one of an LTE eNodeB, or a usable system, wherein the plurality of CSFB parameters comprise a channel list, a system time, and a neighbor list, and code for performing one or more system acquisition actions based on the at least one of the plurality of obtained CSFB parameters.

Another aspect relates to an apparatus for wireless communications. The apparatus can include processing system configured to obtain at least one of a plurality of CSFB parameters from at least one of an LTE eNodeB, or a usable system, wherein the plurality of CSFB parameters comprise a channel list, a system time, and a neighbor list, and perform one or more system acquisition actions based on the at least one of the plurality of obtained CSFB parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a matrix illustrating example CSFB system acquisition procedures, according to an aspect.

DETAILED DESCRIPTION

Figure 1:
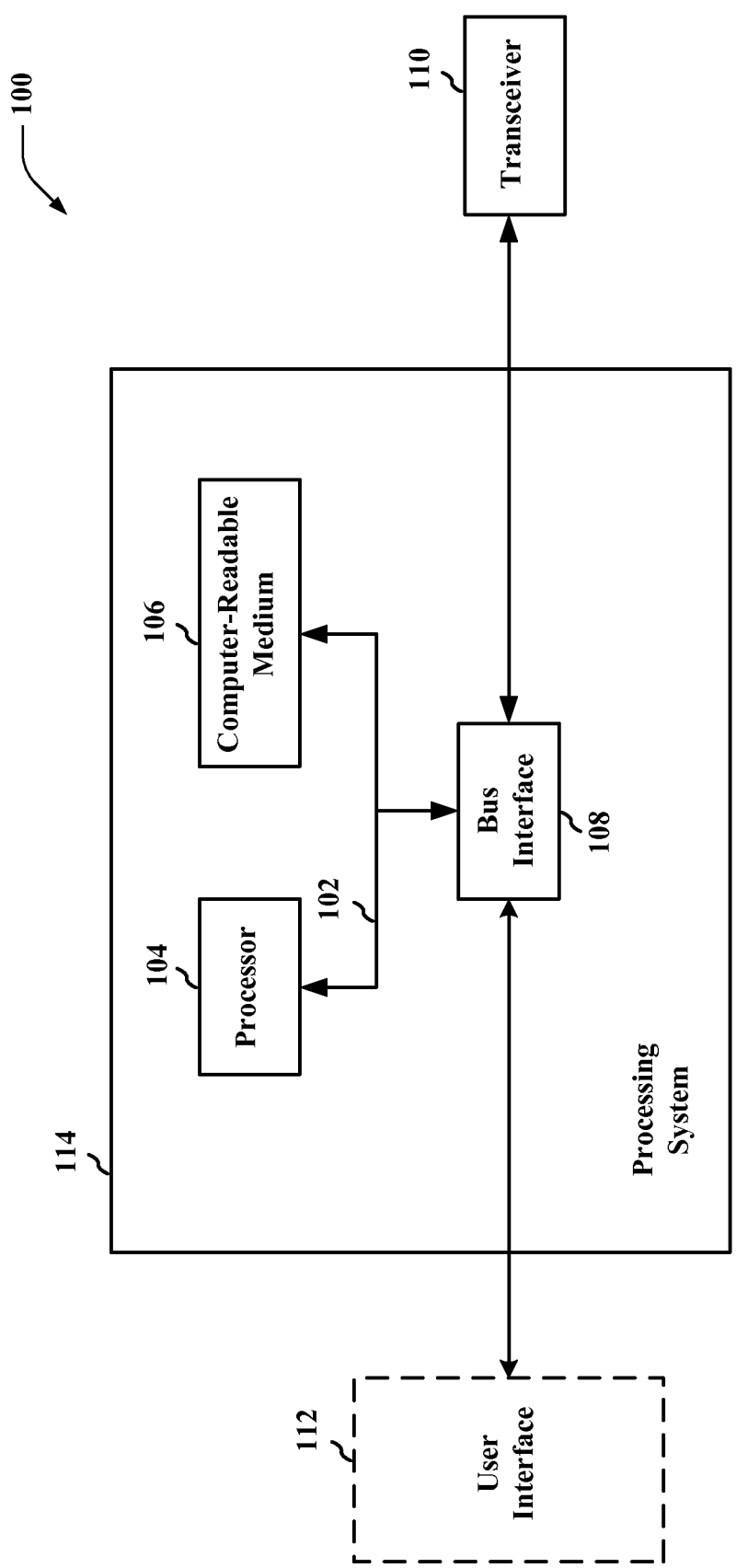
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
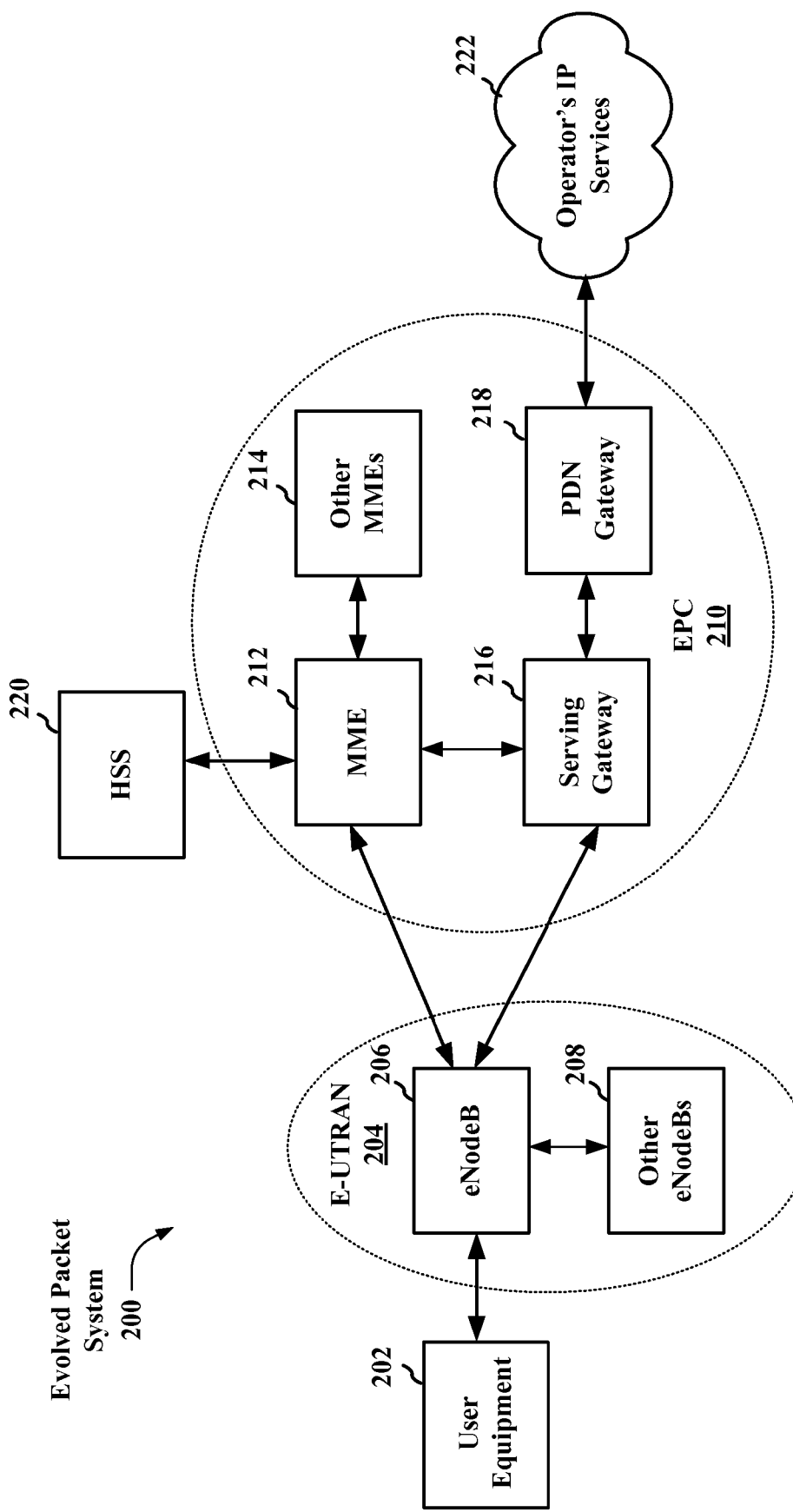
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more UE 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
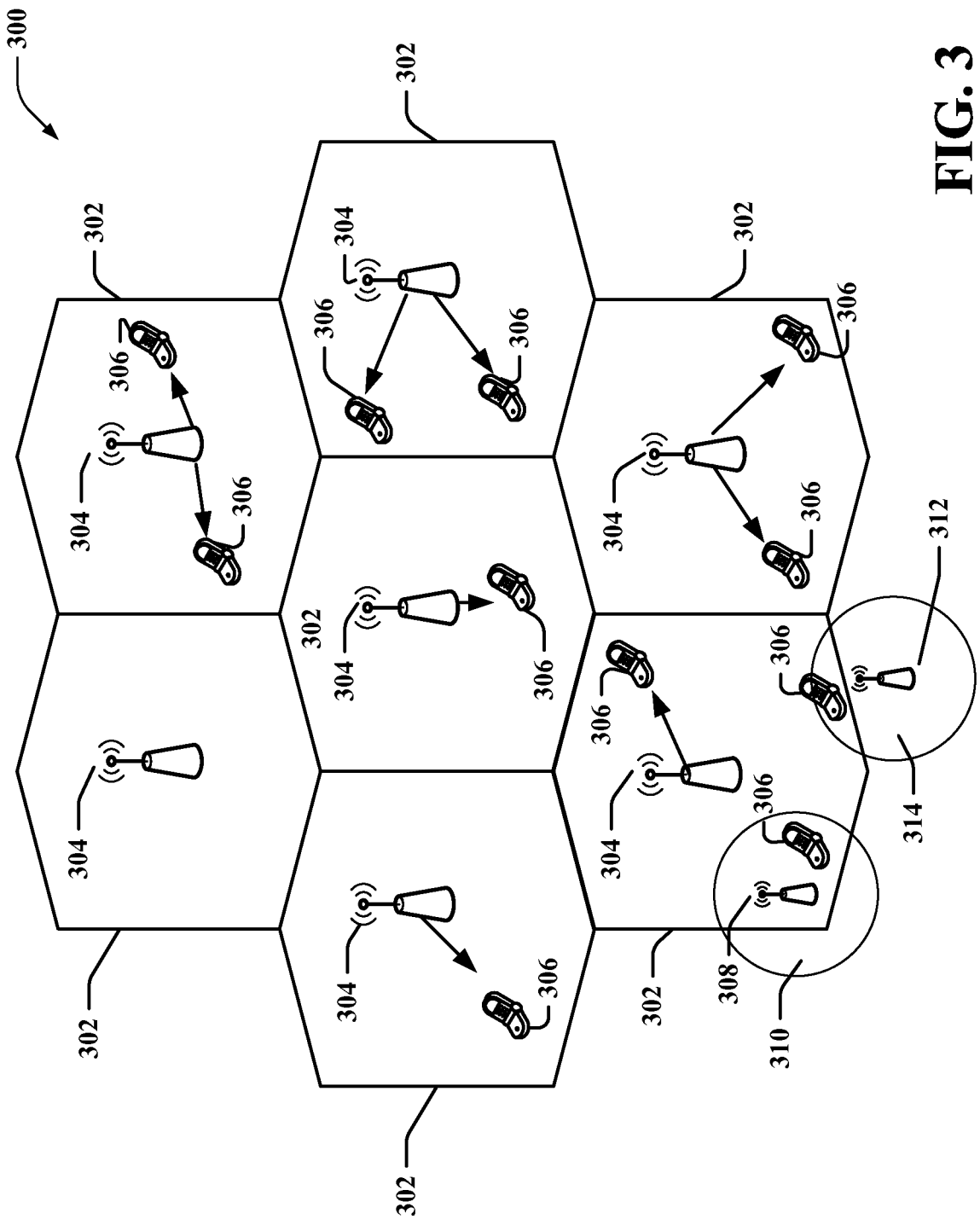
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
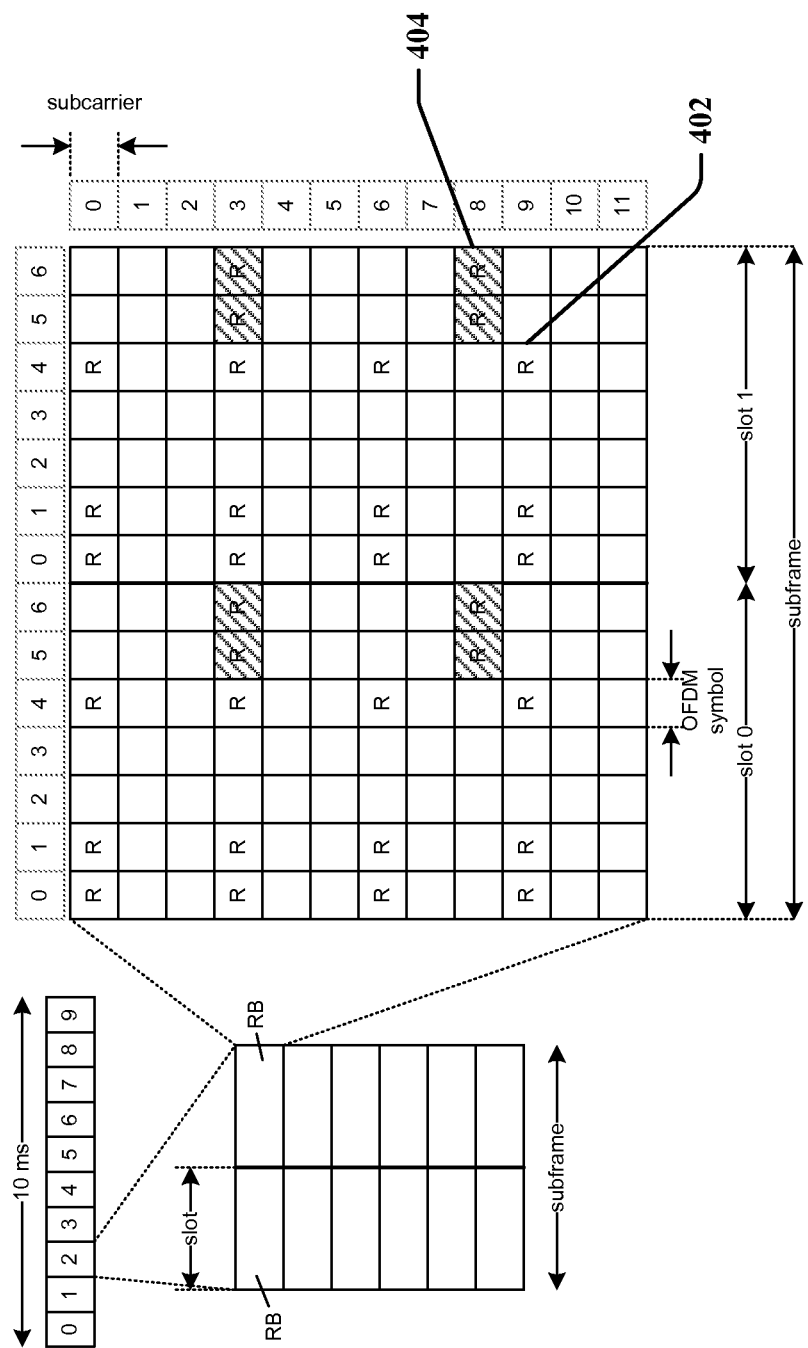
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
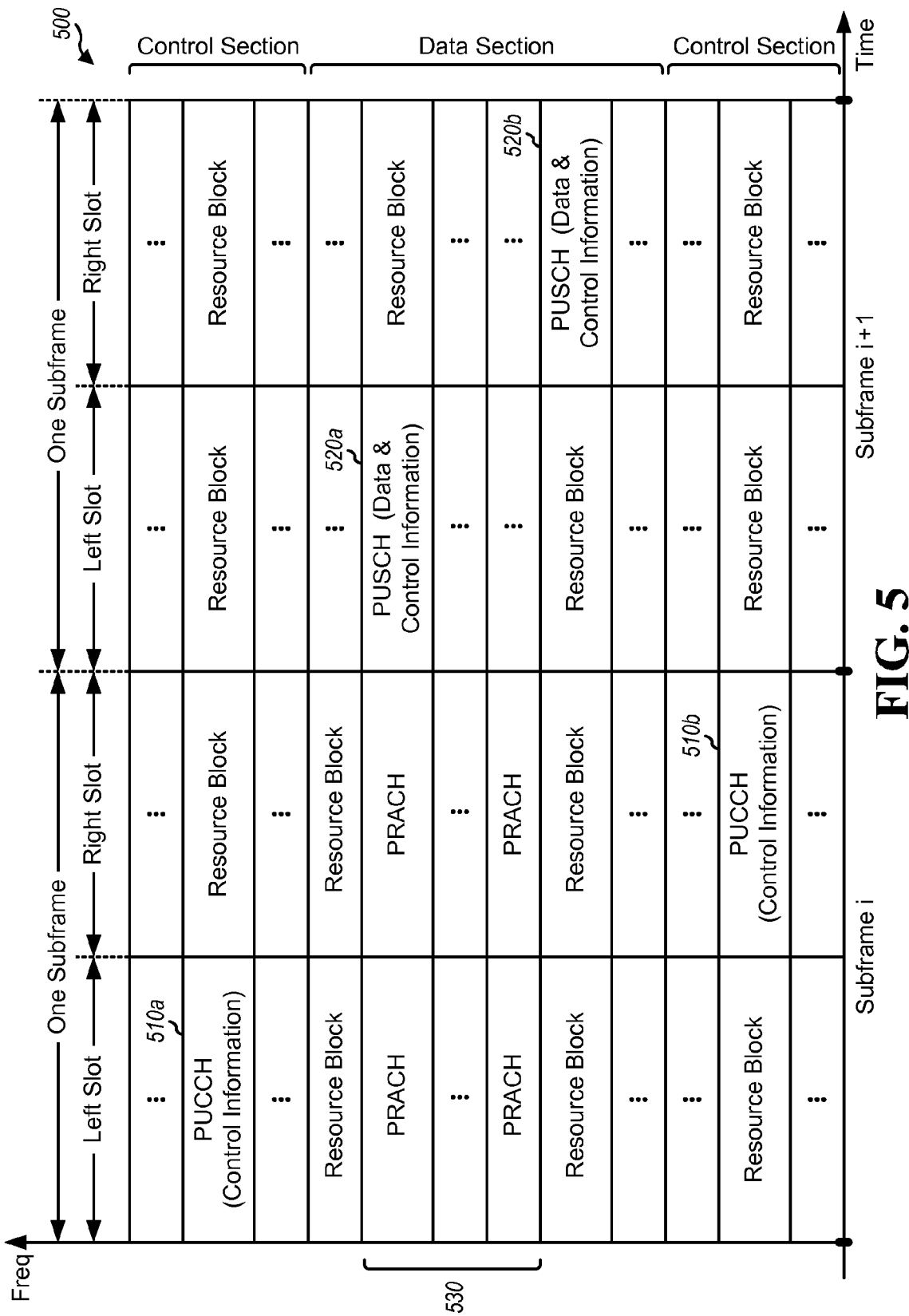
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
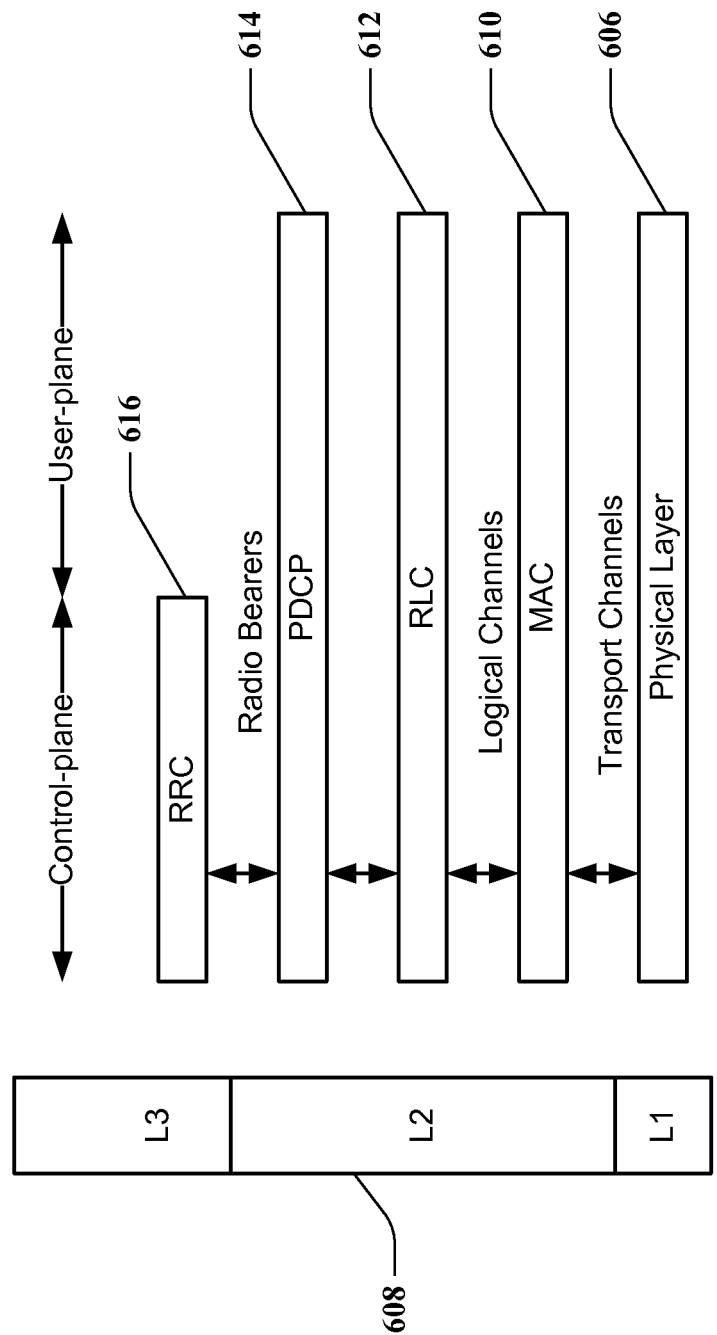
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
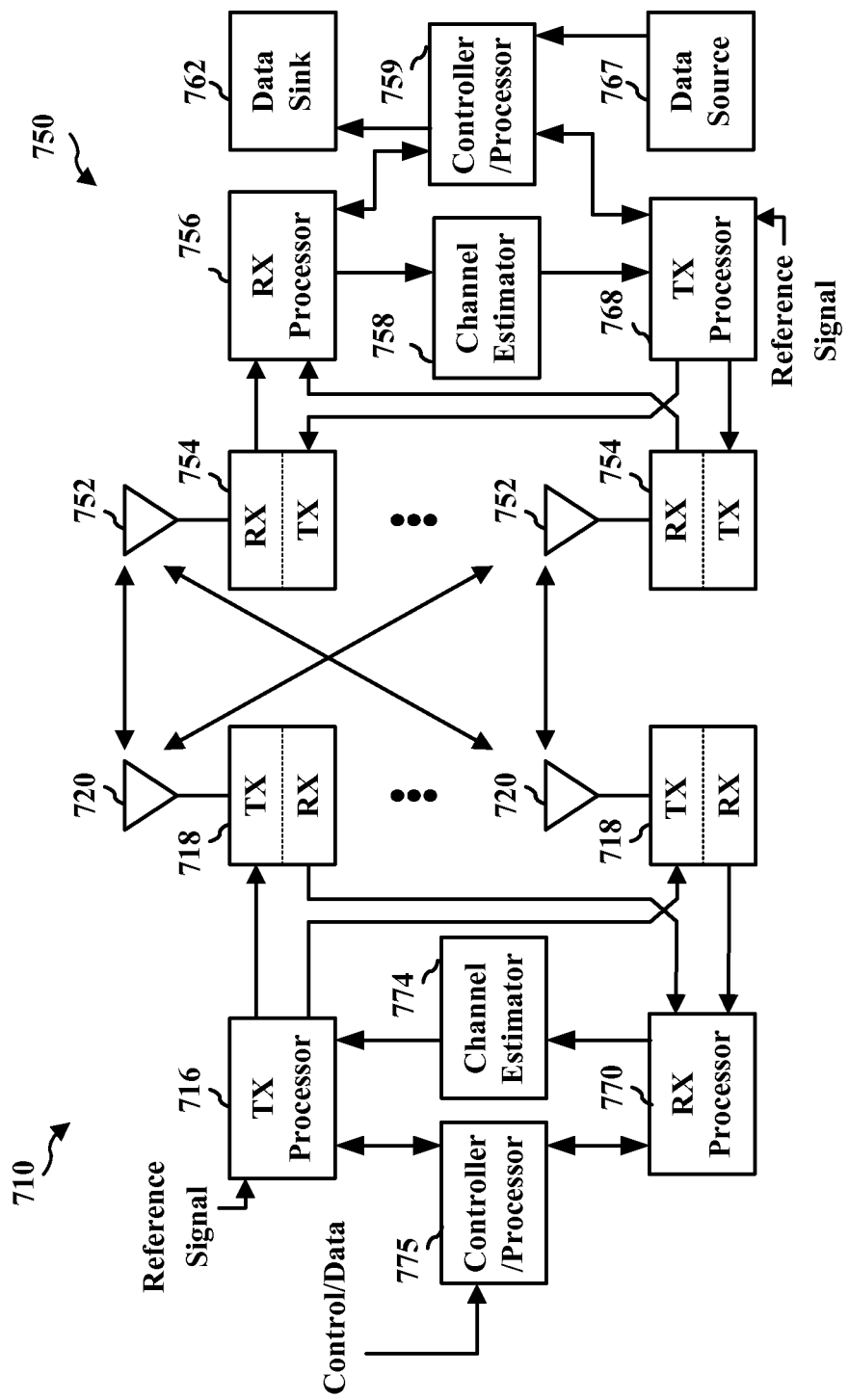
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the DL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 775 provides demultiplexing between transport and logical channels, packet reassembly, deciphering, header decompression, control signal processing to recover upper layer packets from the UE 750. Upper layer packets from the controller/processor 775 may be provided to the core network. The controller/processor 775 is also responsible for error detection using an ACK and/or NACK protocol to support HARQ operations.

The processing system 114 described in relation to FIG. 1 includes the UE 750. In particular, the processing system 114 includes the TX processor 768, the RX processor 756, and the controller/processor 759.

FIGS. 8, 10, 11 and 12 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
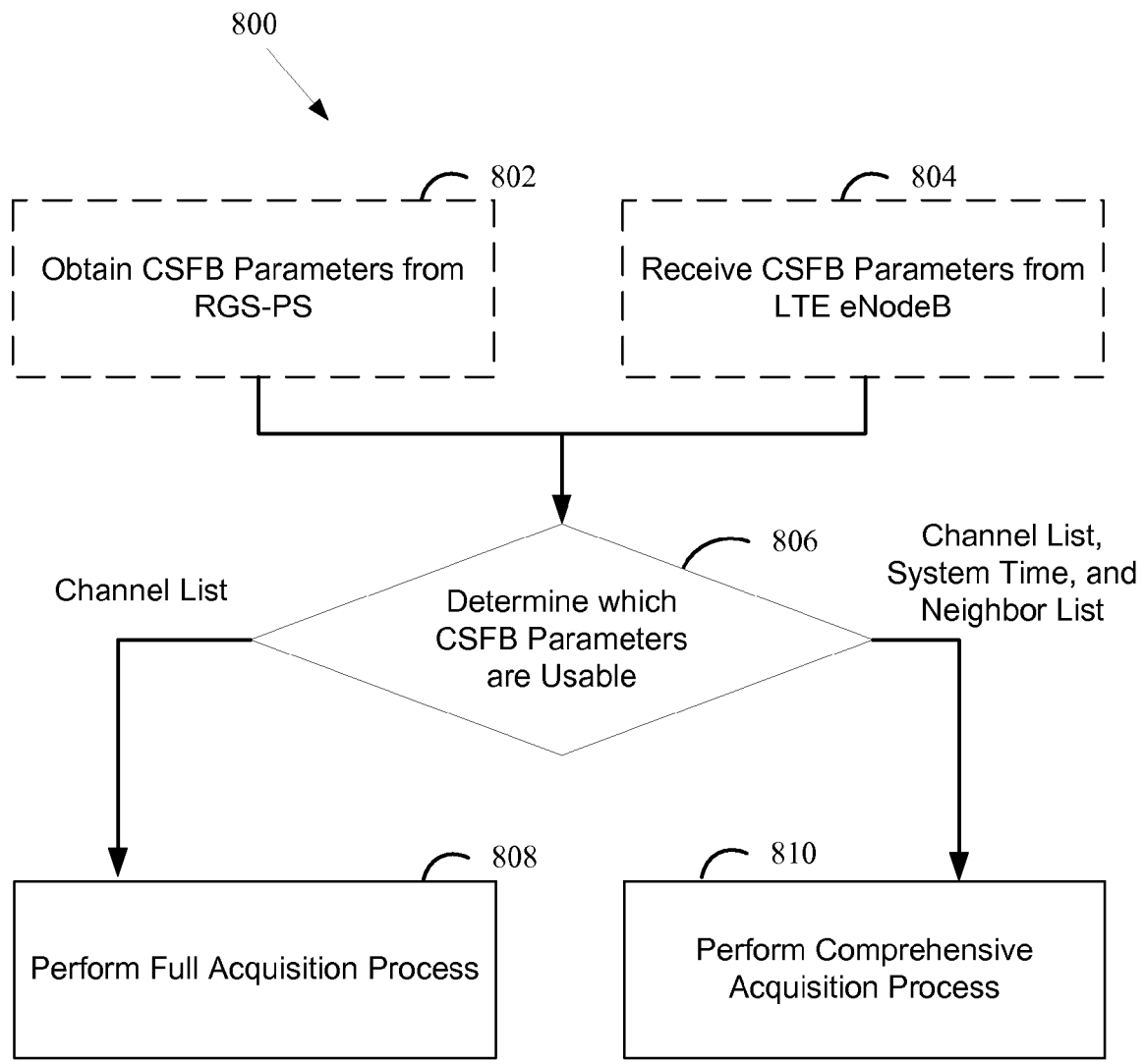
FIG. 8 is a flow chart of a method of wireless communication.

FIG. 8 is a flow chart 800 of a method of wireless communication. Generally, when a phone number is dialed to place a circuit switch (CS) (e.g., 1x system based) call, if the UE were camped on an LTE network, a CSFB procedure may be employed. To implement a CSFB procedure various CSFB parameters may be used to establish a 1x system connection. In one aspect, the CSFB parameters may include a channel list, a system time, and a neighbor list. In operation, once the CSFB parameters are obtained, the UE may performing hashing on a channel list and may tune to a channel that has been hashed. In one aspect, the process may be referred to as pre-hashing. Thereafter, the UE may acquire a 1x system using a system time to search pilots from a neighbor list. In one aspect, the system time and neighbor list may be a CMA system time and a CDMA neighbor list.

In one aspect, a UE may obtain at least one of a plurality of CSFB parameters from one or more network sources. In one optional aspect, at reference numeral 802, one or more of the plurality of CSFB parameters may be obtained from a usable system. In one aspect, a usable system may include a system which the UE was camped on recently (e.g., a recently good system (RGS)). In another aspect, a usable system may be defined by the UE, an operator, etc. (e.g., a preferred system (PS)). In another aspect, a usable system may be a home system. In still another aspect, a PS may be a home system (e.g., a system upon which the UE camped and/or obtained service). As such, a usable system may be a RGS-PS that is a home system. In one aspect, the usable system parameters may be stored (e.g., cached) by the UE for subsequent usage. In another aspect, the stored usable system parameters may include a time stamp value to allow the UE to determine relative freshness of the stored usable system parameters. In another optional aspect, at reference numeral 804, a UE may receive one or more CSFB parameters from a serving eNodeB (e.g., an LTE eNodeB). At reference numeral 806, it is determined which CSFB parameters have been obtained and may be usable for acquiring a 1x system. A matrix providing various system acquisition configurations and aspect is provided with reference to FIG. 9. If at reference numeral 806, it is determined that a channel list is usable and at least one of a system time and a neighbor list are unusable, then at reference numeral 808 a full acquisition process may be performed. A full acquisition process is discussed with reference to FIG. 10. By contrast, if at reference numeral 806, it is determined that all of a CDMA channel list, a CDMA system time, and a CDMA neighbor list are usable, then at reference numeral 810, a comprehensive acquisition process may be performed. A comprehensive acquisition process is discussed with reference to FIGS. 11 and 12.

FIG. 9 is a matrix 900 illustrating example CSFB system acquisition procedures. In the depicted matrix 900, a condition is indicated to be present with a "1", absent with a "0", and no applicable with a "NA." Generally, various CSFB parameters: channel list 902, system time 904, and neighbor list 906.

These CSFB parameters may be obtained from various network sources, such as but not limited to, LTE provided system time 908, LTE provided neighbor list 910, RGS-PS included in channel list from LTE 912, system time provided from usable RGS-PS 914, neighbor set and active set provided from usable RGS-PS 916, etc. In one aspect, a time stamp may be associated with any stored RGS-PS parameters, and the UE may use the stored parameters from a RGS-PS when the time stamp indicated the RGS-PS parameters where obtained within a threshold time. In one aspect, the UE may perform maintenance on the RGS-PS values to assure the values are maintained in a useable condition. For example, RGS-PS system time may be usable where the UE was on the RGS-PS no more than a threshold time ago, and the system time has been maintained since that time. Additionally, the UE may reconnect with a RGS-PS to assure the RGS-PS values are maintained in a useable condition. In another example, a last RGS-PS active set and neighbor list may be used when the UE was on the RGS-PS no more than a threshold time ago.

As depicted in FIG. 9, depending on which CSFB parameters (902, 904, and 906) are available, and from which sources the CSFB parameters are obtained (908, 910, 912, 914 and 916), various actions may be taken. In one aspect, a full acquisition process 918 may be performed. A full acquisition process is discussed with reference to FIG. 10. In another aspect, a comprehensive acquisition process 920 may be performed. A comprehensive acquisition process is discussed with reference to FIGS. 11 and 12.

In one aspect, CSFB parameters may be received from an LTE eNodeB 922. In another aspect, RGS-PS parameters may be provided in a concatenated format 924 with LTE parameters, such as by appending channel data of a RGS-PS at the end of a channel list provided by an LTE eNodeB. For example, the channel data may be a CDMA channel data and the channel list may be a CDMA channel list. In another aspect, CSFB parameters may be provided in a merged list 928. For example, a merged list may include a LTE neighbor list, RGS-PS active set, and RGS-Ps neighbor list. In one aspect, where multiple sources of a CSFB parameter are available, the UE may select from a preferred source 926. For example, where a parameter is available from an LTE eNodeB and a RGS-PS, the UE may select to use the LTE obtained source, and if the LTE obtained source fails, the UE may obtain parameters from the RGS-PS.

Figure 10:
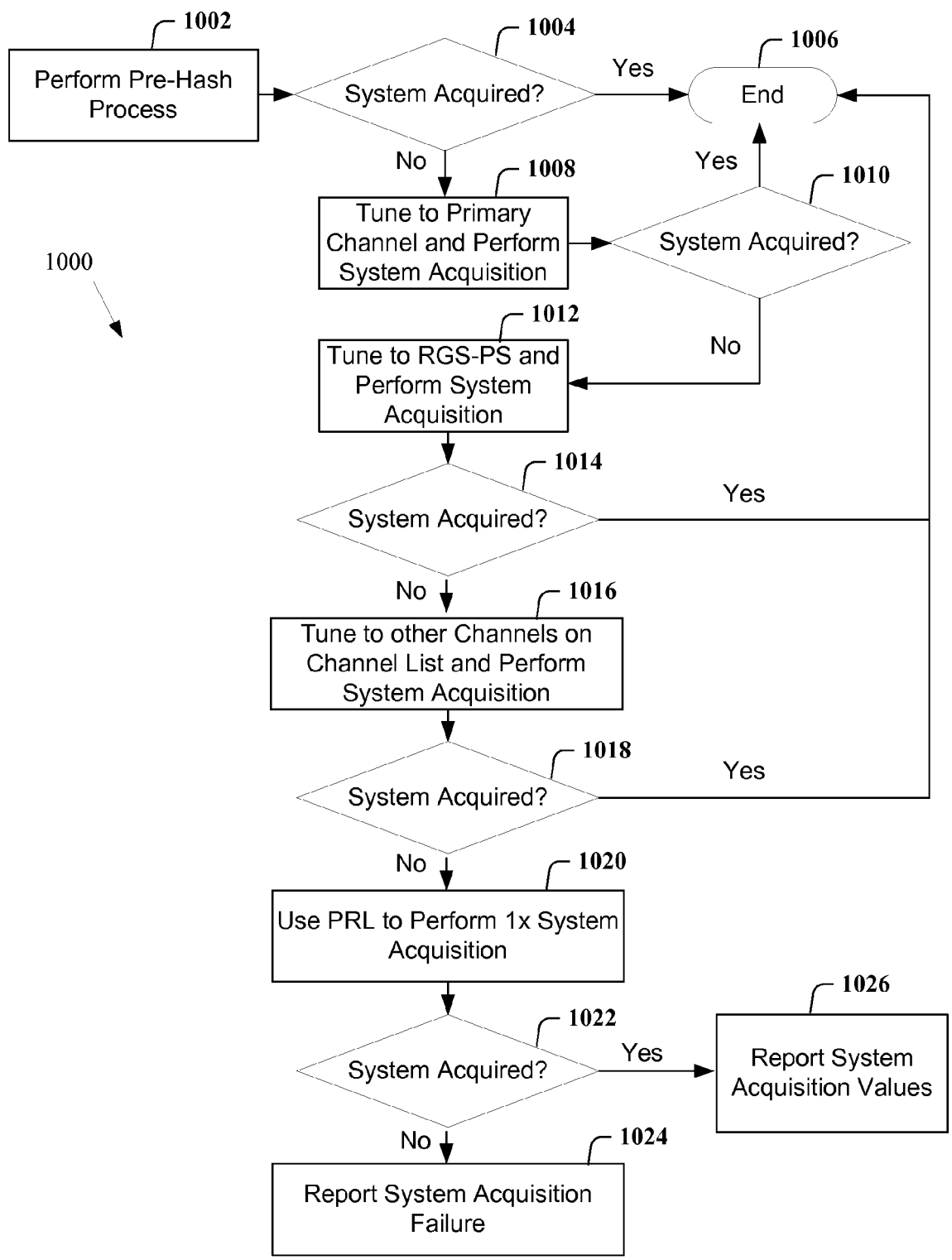
FIG. 10 is a flow chart of a full acquisition procedure, according to an aspect.

FIG. 10 is a flow chart of a full acquisition procedure 1000. Generally, during a full acquisition process, neither a system time, nor a neighbor list may be known. At reference numeral 1002, a pre-hashing process may be performed. In one aspect, pre-hashing may include hashing on a channel list and tuning to a channel that has been hashed. For example, hashing on a CDMA channel list and tuning to a CDMA channel that has been hashed. At reference numeral 1004, it is determined whether a system has been acquired. If at reference numeral 1004, it is determined the system has been acquired, then at reference numeral 1006, the process may terminate. By contrast, if at reference numeral 1004, it is determined that the system has not been acquired then, at reference numeral 1008 a primary channel from the channel list may be scanned. As used herein, the channel list is a general term and may include, but is not limited to, a CDMA channel list, a CDMA channel list provided by LTE (e.g., CDMA channel list 912), a CDMA channel list provided from a merged and/or concatenated list from LTE and RGS-PS values (e.g., merged list 928, concatenated list 924), etc. In such an aspect, the UE may tune to a primary channel and may measure a received automatic gain control (Rx AGC). The UE may then perform a full acquisition process if the Rx AGC is above a threshold value. In another aspect, the UE may place the primary channel and the determined Rx AGC in a to-scan-later list if the Rx AGC is not above a threshold value.

At reference numeral 1010, it is determined whether a system has been acquired. If at reference numeral 1010, it is determined the system has been acquired, then at reference numeral 1006 the process may terminate. By contrast, if at reference numeral 1010, it is determined that the system has not been acquired then a channel from a RGS-PS may be scanned 1012. In such an aspect, the UE may tune to RGS-PS channel and may measure a Rx AGC. The UE may then perform a full acquisition process if the Rx AGC is above a threshold value. In another aspect, the UE may place the RGS-PS channel and the determined Rx AGC in a to-scan-later list if the Rx AGC is not above a threshold value.

At reference numeral 1014, it is determined whether a system has been acquired. If at reference numeral 1014, it is determined the system has been acquired, then at reference numeral 1006 the process may terminate. By contrast, if at reference numeral 1014, it is determined that the system has not been acquired then other channels on the channel list may be tuned to and system acquisition may be performed 1016. In such an aspect, the UE may tune to each channel on the channel list and may measure a Rx AGCs. The UE may then perform a full acquisition process on of each channel if its Rx AGC is above a threshold value. In another aspect, the UE may place any of the channel list and their determined Rx AGCs in a to-scan-later list if their Rx AGCs are not above a threshold value.

At reference numeral 1018, it is determined whether a system has been acquired. If at reference numeral 1018, it is determined the system has been acquired, then at reference numeral 1006 the process may terminate. By contrast, if at reference numeral 1018, it is determined that the system has not been acquired then one or more channels from a preferred roaming list (PRL) may be used to perform 1x system acquisition 1020.

At reference numeral 1022, it is determined whether the 1x system has been acquired. If at reference numeral 1022, it is determined the 1x system has been acquired, then at reference numeral 1026 the 1x system values may be communicated to the serving LTE eNodeB. In one such aspect, the reported information may include, but is not limited to, an indication that none of the channels provided by the LTE eNodeB were available, the channel on the PRL that has been acquired, etc. Further, in such an aspect, the serving LTE eNodeB may be informed of any mistakes in the channels that it provided and/or may update values with the channels acquired via PRL. By contrast, if at reference numeral 1022, it is determined that the system has not been acquired, then a reference numeral 1024 a system acquisition failure message may be transmitted to a serving LTE eNodeB.

Figure 11:
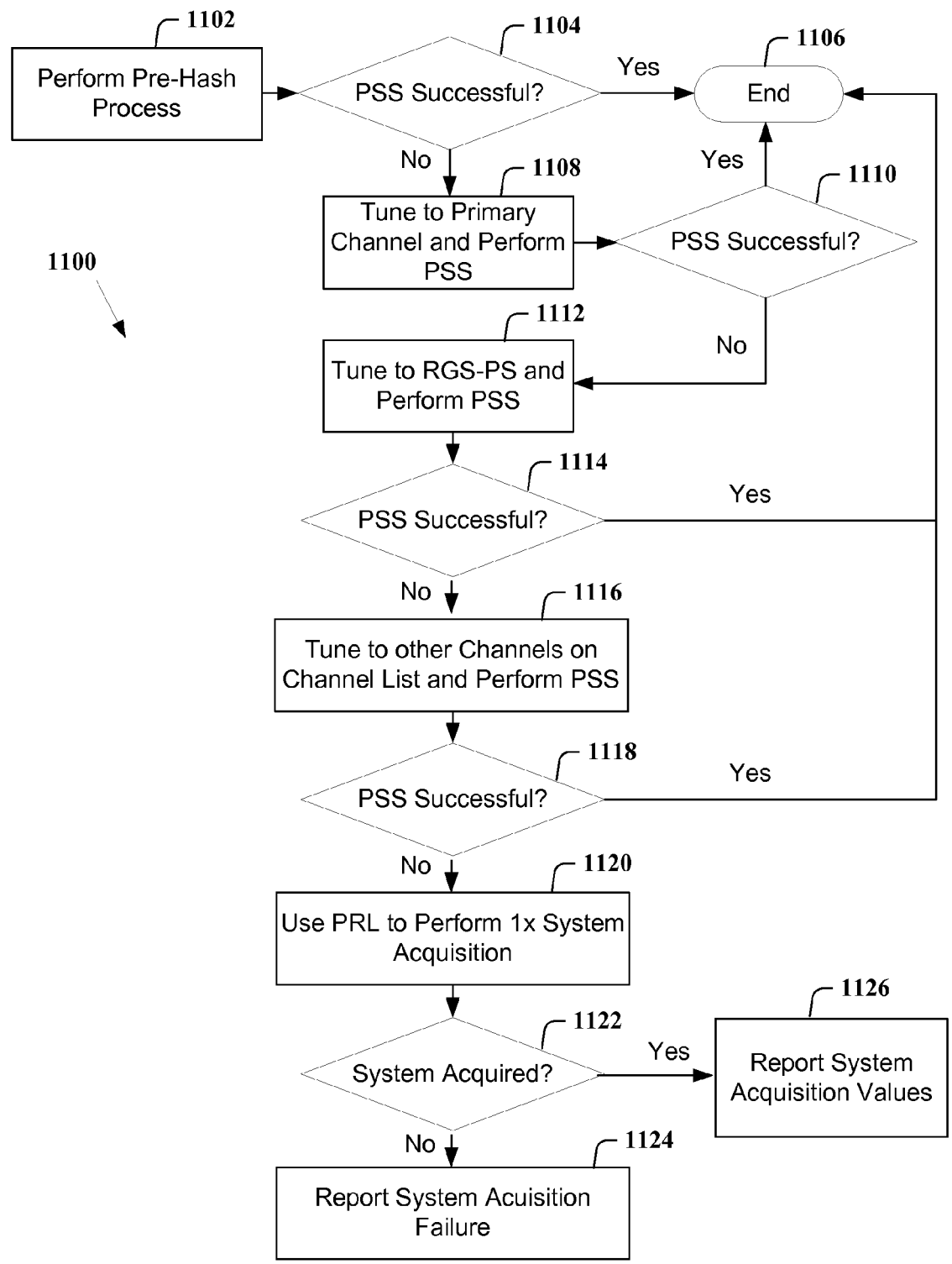
FIG. 11 is a flow chart of a comprehensive acquisition procedure, according to an aspect.

FIG. 11 is a flow chart of a comprehensive acquisition procedure 1100. Is one aspect, a comprehensive acquisition process may include a pilot search and scan (PSS) process and a full acquisition process if the PSS process fails. At reference numeral 1102, a pre-hashing process may be performed as part of a PSS process. One aspect of a PSS process is discussed with reference to FIG. 12. In one aspect, pre-hashing may include hashing on a channel list and tuning to a channel that has been hashed. At reference numeral 1104, it is determined whether the PSS process was successful. If at reference numeral 1104, it is determined the PSS process was successful, then at reference numeral 1106, the process may terminate. By contrast, if at reference numeral 1104, it is determined that the PSS process was not successful then at reference numeral 1108 a primary channel from the channel list may be processed. In such an aspect, the UE may tune to a primary channel and may perform a PSS process.

At reference numeral 1110, it is determined whether a PSS process was successful. If at reference numeral 1110, it is determined the PSS process was successful, then at reference numeral 1106 the process may terminate. By contrast, if at reference numeral 1110, it is determined that the PSS process was not successful then a channel from a RGS-PS may be scanned 1112. In such an aspect, the UE may perform a PSS process on a RGS-PS channel.

At reference numeral 1114, it is determined whether a PSS process was successful. If at reference numeral 1114, it is determined the PSS process was successful, then at reference numeral 1106 the process may terminate. By contrast, if at reference numeral 1114, it is determined that the system has not been acquired then other channels on the channel list may be tuned to and system acquisition may be performed 1116. In such an aspect, the UE may tune to each channel on the channel list and may measure a Rx AGCs. As used herein, the channel list is a general term and may include, a CDMA channel list, a CDMA channel list provided by LTE (e.g., CDMA channel list 912), a CDMA channel list provided from a merged and/or concatenated list from LTE and RGS-PS values (e.g., merged list 928, concatenated list 924), etc. The UE may then perform a PSS process on of each channel if its Rx AGC is above a threshold value. In another aspect, the UE may place any of the channel list and their determined Rx AGCs in a to-scan-later list if their Rx AGCs are not above a threshold value. By contrast, if at reference numeral 1114, it is determined that the PSS process was not successful then other channels from a channel list may have a PSS process performed 1116. In such an aspect, the UE may tune to each of the channels and may perform a PSS process.

At reference numeral 1118, it is determined whether a PSS process was successful. If at reference numeral 1118, it is determined the PSS process was successful, then at reference numeral 1106 the process may terminate. By contrast, if at reference numeral 1118, it is determined that the PSS process was not successful then one or more channels from a preferred roaming list (PRL) may be used to perform 1x system acquisition 1120.

At reference numeral 1122, it is determined whether a PSS process was successful. If at reference numeral 1122, it is determined the 1x system has been acquired, then at reference numeral 1126 the 1x system values may be communicated to the serving LTE eNodeB. In one such aspect, the reported information may include, but is not limited to, an indication that none of the channels provided by the LTE eNodeB were available, the channel on the PRL that has been acquired, etc. Further, in such an aspect, the serving LTE eNodeB may be informed of any mistakes in the channels that it provided and/or may update values with the channels acquired via PRL. By contrast, if at reference numeral 1122, it is determined that the PSS process was not successful then a reference numeral 1124 a system acquisition failure message may be transmitted to a serving LTE eNodeB.

Figure 12:
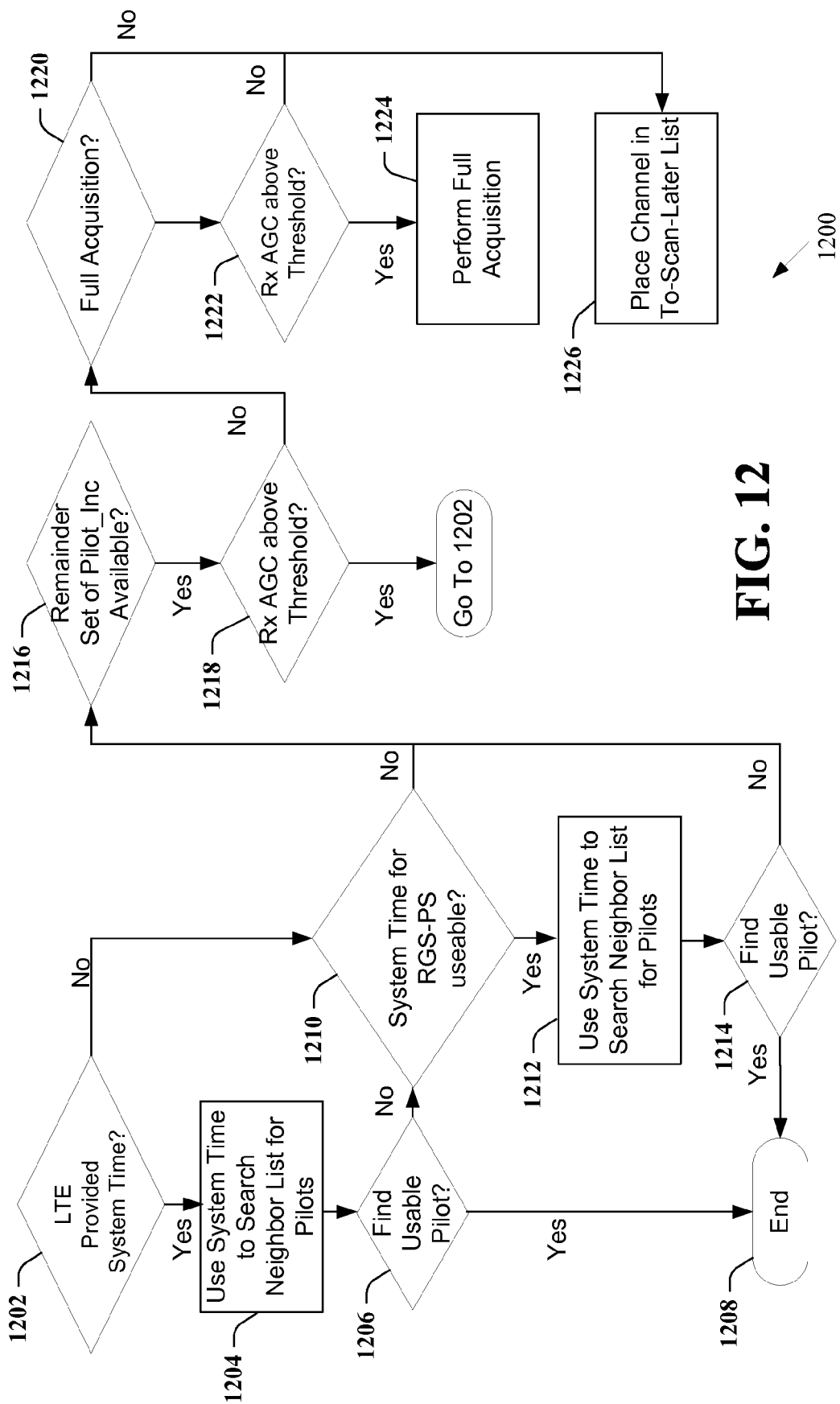
FIG. 12 is a flow chart of a pilot search and scan procedure, according to an aspect.

FIG. 12 is a flow chart of a pilot search and scan procedure 1200. Generally, in a PSS process, there may be no assumption as to whether 1x system measurements have been performed. Further, for a given channel a PSS process may use a system time and neighbor list. For example, the UE may search from pilots on neighbor lists using system time (obtained from an LTE eNodeB, a RGS-PS, etc.). In one aspect, if a UE can not find a usable pilot on a neighbor list, a sufficiently strong Rx AGC may be indicative that a search of a remainder set (e.g., assuming pilot increment data is provided or may be estimated). As discussed below, assuming a PSS process is not successful a full acquisition process may be performed.

At reference numeral 1202, it is determined whether a LTE eNodeB provided system time. If at reference numeral 1202 it is determined that the LTE eNodeB provided system time, then at reference numeral 1204 the provided system time may be used to search a neighbor list for pilots. In one aspect, the neighbor list may be received from a LTE eNodeB. In another aspect, the neighbor list may be obtained from a RGS-PS. At reference numeral 1206, it is determined whether a usable pilot has been found. If at reference numeral 1206, it is determined a usable pilot has been found, then at reference numeral 1208 the process may terminate. By contrast, if the system time was not provided by the LTE eNodeB and/or if a usable pilot has not been found, then at reference numeral 1210 it is determined whether a system time from RGS-PS is still usable. In one aspect, system time from a RGS-PS may be considered usable when a time stamp associated with the RGS-PS system time is less than a time threshold. In another aspect, system time from a RGS-PS may be considered useable when the RGS-PS system time values have been maintained by the UE. If at reference numeral 1210 it is determined that the system time provided by the RGS-PS is useable, then at reference numeral 1212 the provided system time may be used to search a neighbor list for pilots. If at reference numeral 1214, it is determined a usable pilot has been found, then at reference numeral 1208 the process may terminate.

By contrast, if at reference numeral 1214, it is determined that a usable pilot has not been found, then at reference numeral 1216, it is determined is a remainder set is available for searching for a pilot. In one aspect, a remainder set may be obtained from processing a pilot increment value, where the pilot increment value may be associated with a neighbor list. If at reference numeral 1216, it is determined that a remainder set is present, then at reference numeral 1218 it is determined if any sets have an Rx AGC above a threshold. If at reference numeral 1218 it is determined any sets have an Rx AGC above the threshold, then the process, as described with reference to reference numeral 1202 may be performed on the one or more remainder sets.

By contrast, if at reference numeral 1218 it is determined that no remainder sets have RxAGC values above a threshold, then at reference numeral 1220 it is determined if a full acquisition process is to be performed. A full acquisition process may be described with reference to FIG. 9. If at reference numeral 1220 at full acquisition process is to be performed, then at reference numeral 1222 it is determined if any channels have Rx AGC values above a threshold. If at reference numeral 1222 it is determined one or more channels are above the threshold, then at reference numeral 1224, a full acquisition process may be performed. By contrast, if a full acquisition process is not to be performed and/or no channels have an Rx AGC value above a threshold, then at reference numeral 1226 the one or more channels may be placed in a To-Scan-Later list.

Figure 13:
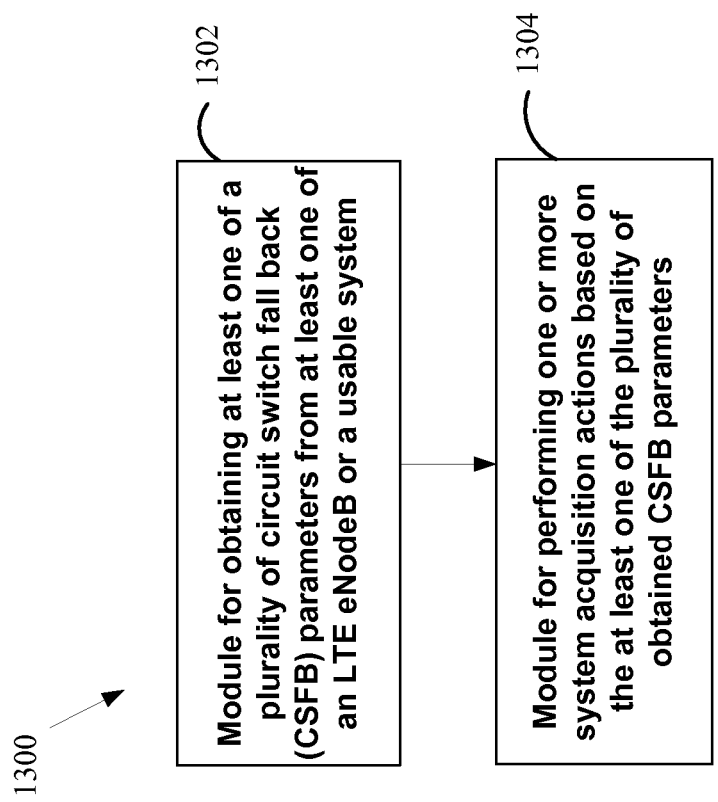
FIG. 13 is a conceptual block diagram illustrating the functionality of an exemplary apparatus.

FIG. 13 is a conceptual block diagram 1300 illustrating the functionality of an exemplary apparatus 100. The apparatus 100 includes a module 1302 that may obtain at least one of a plurality of CSFB parameters from at least one of an LTE eNodeB or a usable system, wherein the plurality of CSFB parameters comprise a channel list, a system time, and a neighbor list, and a module 1304 that may perform one or more system acquisition actions based on which of the plurality of obtained CSFB parameters.

In one configuration, the apparatus 100 for wireless communication includes means for obtaining at least one of a plurality of CSFB parameters from at least one of an LTE eNodeB or a usable system, wherein the plurality of CSFB parameters comprise a channel list, a system time, and a neighbor list, and means for performing one or more system acquisition actions based on the at least one of the plurality of obtained CSFB parameters. In another configuration, the apparatus 100 includes means for obtaining the at least one of the plurality of CSFB parameters from the usable system, wherein the usable system parameters include band class and channel values, a system time value, an active set, and a neighbor set, means for storing the usable system parameters with an associated timestamp value, and means for determining the usable system parameters are usable when the timestamp value is below a time threshold. In another configuration, the apparatus 100 includes means for maintaining the usable system parameters in a useable condition. In another configuration, the apparatus 100 includes means for performing a pre-hashing process by tuning to one or more channels provided in a channel list to search for a pilot signal. In another configuration, the apparatus 100 includes means for determining the pre-hashing process did not result in a usable pilot, means for tuning to a primary channel in the channel list, and means for performing pilot search and scan process for the primary channel using the system time and neighbor list. In another configuration, the apparatus 100 includes means for determining that a pilot offset increment value is included in the neighbor list, and means for searching a remainder set using the pilot offset increment value for a pilot. In another configuration, the apparatus 100 includes means for determining the pre-hashing process did not result in a usable pilot, means for tuning to a primary channel in the channel list, and means for determining a received automatic gain control value is above a power threshold for the primary channel. In another configuration, the apparatus 100 includes means for determining the pre-hashing process did not result in a usable pilot, means for tuning to each channel in the channel list, means for determining that a received automatic gain control value for each channel does not exceed a power threshold, and means for performing system acquisition using a preferred roaming list. In another configuration, the apparatus 100 includes means for transmitting at least one PRL value to a serving eNodeB, wherein the serving eNodeB uses the at least one transmitted PRL value to update the usable system parameters with the PRL value. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications, comprising:
   obtaining at least one of a plurality of circuit switch fall back (CSFB) parameters from at least one of an LTE eNodeB or a usable system, wherein the plurality of CSFB parameters comprise a channel list, a system time, and a neighbor list;
   determining if any of the plurality of CSFB parameters are usable and updating a matrix to indicate the usability of the obtained CSFB parameters, where the matrix defines system acquisition procedures based on usable CSFB parameters;
   performing a full system acquisition process defined by the matrix when one or more of the plurality of CSFB parameters are not useable; and
   performing a comprehensive system acquisition process defined by the matrix when each of the plurality of CSFB parameters is useable.

2. The method of claim 1, wherein the at least one of the plurality of CSFB parameters is obtained from the usable system, and wherein the usable system comprises at least one of a recently good system (RGS), a preferred system (PS), or a home system.

3. The method of claim 1, wherein the obtaining further comprises:
   obtaining the at least one of the plurality of CSFB parameters from the usable system, wherein the usable system parameters include band class and channel values, a system time value, an active set, and a neighbor set;
   storing the usable system parameters with an associated timestamp value; and
   determining the usable system parameters are usable when the timestamp value is below a time threshold.

4. The method of claim 3, further comprising maintaining the usable system parameters in a useable condition.

5. The method of claim 1, wherein the obtaining comprises obtaining the channel list, and wherein the performing the full system acquisition process or the comprehensive system acquisition process includes performing a pre-hashing process by tuning to one or more channels provided in the channel list to search for a pilot signal.

6. The method of claim 5, wherein the obtaining comprises obtaining the system time and the neighbor list, the method further comprising:
   determining the pre-hashing process did not result in a usable pilot;
   tuning to a primary channel in the channel list; and
   performing pilot search and scan process for the primary channel using the system time and the neighbor list.

7. A method for wireless communications, comprising:
   obtaining a plurality of circuit switch fall back (CSFB) parameters from at least one of an LTE eNodeB or a usable system, wherein the plurality of CSFB parameters comprise a channel list, a system time, and a neighbor list; and
   performing one or more system acquisition actions based on the at least one of the plurality of obtained CSFB parameters, including:

performing a pre-hashing process by tuning to one or more channels provided in the channel list to search for a pilot signal;
determining the pre-hashing process did not result in a usable pilot;
tuning to a primary channel in the channel list; and
performing pilot search and scan process for the primary channel using the system time and the neighbor list, wherein the pilot search and scan process further comprises:
determining that a pilot offset increment value is included in the neighbor list; and
searching a remainder set using the pilot offset increment value for a pilot.

8. The method of claim 5, further comprising:
determining the pre-hashing process did not result in a usable pilot;
tuning to a primary channel in the channel list; and
either determining a received automatic gain control value is above a power threshold for the primary channel, or
determining that a received automatic gain control value for each channel does not exceed a power threshold; and
performing system acquisition using a preferred roaming list (PRL).

9. The method of claim 8, further comprising:
transmitting at least one PRL value to a serving eNodeB, wherein the serving eNodeB uses the at least one transmitted PRL value to update the usable system parameters with the PRL value.

10. An apparatus for wireless communication, comprising:
means for obtaining at least one of a plurality of CSFB parameters from at least one of an LTE eNodeB, or a usable system, wherein the plurality of CSFB parameters comprise a channel list, a system time, and a neighbor list;
means for determining if any of the plurality of CSFB parameters are usable and means for updating a matrix to indicate the usability of the obtained CSFB parameters, where the matrix defines system acquisition procedures based on usable CSFB parameters; and
means for performing a full system acquisition process defined by the matrix when one or more of the plurality of CSFB parameters are not useable; and
means for performing a comprehensive system acquisition process defined by the matrix when each of the plurality of CSFB parameters is useable.

11. The apparatus of claim 10, wherein the at least one of the plurality of CSFB parameters is obtained from the usable system, and wherein the usable system comprises at least one of a recently good system (RGS), a preferred system (PS), or a home system.

12. The apparatus of claim 10, wherein the means for obtaining further comprises:
means for obtaining the at least one of the plurality of CSFB parameters from the usable system, wherein the usable system parameters include band class and channel values, a system time value, an active set, and a neighbor set;
means for storing the usable system parameters with an associated timestamp value; and
means for determining the usable system parameters are usable when the timestamp value is below a time threshold.

13. The apparatus of claim 12, further comprising means for maintaining the usable system parameters in a useable condition.

14. The apparatus of claim 10, wherein the means for obtaining obtains the channel list, and wherein the means for performing the full system acquisition process or the comprehensive system acquisition process performs a pre-hashing process by tuning to one or more channels provided in the channel list to search for a pilot signal.

15. The apparatus of claim 14, wherein the means for obtaining comprises means for obtaining the system time and the neighbor list, the apparatus further comprising:
means for determining the pre-hashing process did not result in a usable pilot;
means for tuning to a primary channel in the channel list; and
means for performing pilot search and scan process for the primary channel using the system time and the neighbor list.

16. An apparatus for wireless communication, comprising:
means for obtaining a plurality of CSFB parameters from at least one of an LTE eNodeB, or a usable system, wherein the plurality of CSFB parameters comprise a channel list, a system time, and a neighbor list; and
means for performing one or more system acquisition actions based on the at least one of the plurality of obtained CSFB parameters, wherein the means for performing one or more system acquisition actions further comprises:
means for performing a pre-hashing process by tuning to one or more channels provided in the channel list to search for a pilot signal;
means for determining the pre-hashing process did not result in a usable pilot;
means for tuning to a primary channel in the channel list; and
means for performing pilot search and scan process for the primary channel using the system time and the neighbor list, wherein the means for performing the pilot search and scan process further comprises:
means for determining that a pilot offset increment value is included in the neighbor list; and
means for searching a remainder set using the pilot offset increment value for a pilot.

17. The apparatus of claim 14, further comprising:
means for determining the pre-hashing process did not result in a usable pilot;
means for tuning to a primary channel in the channel list; and
either means for determining a received automatic gain control value is above a power threshold for the primary channel, or
means for determining that a received automatic gain control value for each channel does not exceed a power threshold; and
means for performing system acquisition using a preferred roaming list (PRL).

18. The apparatus of claim 17, further comprising:
means for transmitting at least one PRL value to a serving eNodeB, wherein the serving eNodeB uses the at least one transmitted PRL value to update the usable system parameters with the PRL value.

19. A computer program product, comprising:
a non-transitory computer-readable medium comprising code for:
obtaining at least one of a plurality of CSFB parameters from at least one of an LTE eNodeB or a usable system, wherein the plurality of CSFB parameters comprise a channel list, a system time, and a neighbor list;

determining if any of the plurality of CSFB parameters are usable and updating a matrix to indicate the usability of the obtained CSFB parameters, where the matrix defines system acquisition procedures based on usable CSFB parameters; and performing a full system acquisition process defined by the matrix when one or more of the plurality of CSFB parameters are not useable; and performing a comprehensive system acquisition process defined by the matrix when each of the plurality of CSFB parameters is useable.

20. The computer program product of claim 19, wherein the at least one of the plurality of CSFB parameters is obtained from the usable system, and wherein the usable system comprises at least one of a recently good system (RGS), a preferred system (PS), or a home system.

21. The computer program product of claim 19, wherein the computer-readable medium further comprises code for:
obtaining the at least one of the plurality of CSFB parameters from the usable system, wherein the usable system parameters include band class and channel values, a system time value, an active set, and a neighbor set;
storing the usable system parameters with an associated timestamp value; and
determining the usable system parameters are usable when the timestamp value is below a time threshold.

22. The computer program product of claim 19, wherein the computer-readable medium further comprises code for:
obtaining the channel list; and
performing a pre-hashing process by tuning to one or more channels provided in the channel list to search for a pilot signal.

23. The computer program product of claim 22, wherein the computer-readable medium code for obtaining at least one of the plurality of CSFB parameters comprises code for obtaining the system time and the neighbor list, and the computer-readable medium further comprises code for:
determining the pre-hashing process did not result in a usable pilot;
tuning to a primary channel in the channel list; and
performing pilot search and scan process for the primary channel using the system time and the neighbor list.

24. A computer program product, comprising:
a non-transitory computer-readable medium comprising code for:
obtaining a plurality of CSFB parameters from at least one of an LTE eNodeB or a usable system, wherein the plurality of CSFB parameters comprise a channel list, a system time, and a neighbor list; and
performing one or more system acquisition actions based on the at least one of the plurality of obtained CSFB parameters, including:
performing a pre-hashing process by tuning to one or more channels provided in the channel list to search for a pilot signal;
determining the pre-hashing process did not result in a usable pilot;
tuning to a primary channel in the channel list; and
performing pilot search and scan process for the primary channel using the system time and neighbor list, wherein performing the pilot search and scan process further comprises:
determining that a pilot offset increment value is included in the neighbor list; and
searching a remainder set using the pilot offset increment value for a pilot.

25. The computer program product of claim 22, wherein the computer-readable medium further comprises code for:
determining the pre-hashing process did not result in a usable pilot;
tuning to a primary channel in the channel list; and
either determining a received automatic gain control value is above a power threshold for the primary channel, or determining that a received automatic gain control value for each channel does not exceed a power threshold; and
performing system acquisition using a preferred roaming list.

26. The computer program product of claim 25, wherein the computer-readable medium further comprises code for:
transmitting at least one PRL value to a serving eNodeB, wherein the serving eNodeB uses the at least one transmitted PRL value to update the usable system parameters with the PRL value.

27. An apparatus for wireless communication, comprising:
a processing system configured to:
obtain at least one of a plurality of CSFB parameters from at least one of an LTE eNodeB or a usable system, wherein the plurality of CSFB parameters comprise a channel list, a system time, and a neighbor list;
determine if any of the CSFB parameters are usable and update a matrix to indicate the usability of the obtained CSFB parameters, where the matrix defines system acquisition procedures based on usable CSFB parameters;
perform a full system acquisition process defined by the matrix when one or more of the plurality of CSFB parameters are not useable; and
perform a comprehensive system acquisition process defined by the matrix when each of the plurality of CSFB parameters is useable.

28. The apparatus of claim 27, wherein the at least one of the plurality of CSFB parameters is obtained from the usable system, and wherein the usable system comprises at least one of a recently good system (RGS), a preferred system (PS), or a home system.

29. The apparatus of claim 27, wherein the processing system is further configured to:
obtain the at least one of the plurality of CSFB parameters from the usable system, wherein the usable system parameters include band class and channel values, a system time value, an active set, and a neighbor set;
store the usable system parameters with an associated timestamp value; and
determine the usable system parameters are usable when the timestamp value is below a time threshold.

30. The apparatus of claim 29, wherein the processing system is further configured to maintain the usable system parameters in a useable condition.

31. The apparatus of claim 27, wherein the processing system is further configured to:
obtain the channel list; and
perform a pre-hashing process by tuning to one or more channels provided in the channel list to search for a pilot signal.

32. The apparatus of claim 31, wherein the processing system is further configured to obtain the system time and the neighbor list, and the processing system is further configured to:
determine the pre-hashing process did not result in a usable pilot;
tune to a primary channel in the channel list; and perform pilot search and scan process for the primary channel using the system time and the neighbor list.

33. An apparatus for wireless communication, comprising:
a processing system configured to:
  obtain a plurality of CSFB parameters from at least one of an LTE eNodeB or a usable system, wherein the plurality of CSFB parameters comprise a channel list, a system time, and a neighbor list; and
  perform one or more system acquisition actions based on at least one of the plurality of obtained CSFB parameters, including:
    performing a pre-hashing process by tuning to one or more channels provided in the channel list to search for a pilot signal;
    determining the pre-hashing process did not result in a usable pilot;
    tuning to a primary channel in the channel list; and
    performing pilot search and scan process for the primary channel using the system time and neighbor list, wherein the pilot search and scan process includes:
      determine determining that a pilot offset increment value is included in the neighbor list; and
      searching a remainder set using the pilot offset increment value for a pilot.

34. The apparatus of claim 31, wherein the processing system is further configured to:
  determine the pre-hashing process did not result in a usable pilot;
  tune to a primary channel in the channel list; and
  either determine a received automatic gain control value is above a power threshold for the primary channel, or
  determine that a received automatic gain control value for each channel does not exceed a power threshold; and
  perform system acquisition using a preferred roaming list (PRL).

35. The apparatus of claim 34, wherein the processing system is further configured to transmit at least one PRL value to a serving eNodeB, wherein the serving eNodeB uses the at least one transmitted PRL value to update the usable system parameters with the PRL value.

* * * * *